(12) United States Patent
Reischmann et al.

(10) Patent No.: US 9,664,417 B1
(45) Date of Patent: May 30, 2017

(54) TURNTABLE TRACKING DEPLOYMENT SYSTEM

(71) Applicants: Michael J. Reischmann, Eustis, FL (US); Nigel G. Jones, Eustis, FL (US)

(72) Inventors: Michael J. Reischmann, Eustis, FL (US); Nigel G. Jones, Eustis, FL (US)

( * ) Notice: Subject to any disclaimer, the term of this patent is extended or adjusted under 35 U.S.C. 154(b) by 0 days.

(21) Appl. No.: 14/863,122

(22) Filed: Sep. 23, 2015

(51) Int. Cl.
| | |
|---|---|
| *E04D 13/18* | (2014.01) |
| *E04H 14/00* | (2006.01) |
| *F24J 2/52* | (2006.01) |
| *F24J 2/38* | (2014.01) |
| *F24J 2/54* | (2006.01) |
| *F24J 2/46* | (2006.01) |

(52) U.S. Cl.
CPC .............. *F24J 2/5201* (2013.01); *F24J 2/38* (2013.01); *F24J 2/4607* (2013.01); *F24J 2/5431* (2013.01); F24J 2002/5437 (2013.01); F24J 2002/5475 (2013.01)

(58) Field of Classification Search
CPC .. F24J 2/5201; F24J 2/38; F24J 2/4607; F24J 2/5431; F24J 2002/5437; F24J 2002/5475; F24J 2/541; F24J 2/5424; F24J 2002/5458; Y02B 10/20; Y02E 10/47
See application file for complete search history.

(56) References Cited

U.S. PATENT DOCUMENTS

| | | | |
|---|---|---|---|
| 6,284,968 B1* | 9/2001 | Niesyn ...................... | F24J 2/13 126/600 |
| 8,440,950 B1* | 5/2013 | Reischmann .............. | F24J 2/38 126/573 |
| 2002/0023638 A1* | 2/2002 | Buron ........................ | F24J 2/38 126/601 |
| 2008/0040990 A1* | 2/2008 | Vendig ..................... | F24J 2/405 52/173.3 |
| 2009/0032100 A1* | 2/2009 | Oak ....................... | E04F 10/005 136/259 |
| 2011/0120447 A1* | 5/2011 | Sobolewski ............... | F24J 2/38 126/576 |
| 2013/0055999 A1* | 3/2013 | Fairstein .................... | F24J 2/18 126/600 |
| 2015/0337516 A1* | 11/2015 | French, Sr. ............. | E02D 17/20 52/173.3 |

* cited by examiner

*Primary Examiner* — Brian Mattei

(57) ABSTRACT

An energy capturing device is positionable above a roof of a building, structure, or object. Each of a plurality of lifting components has a short leg with an inner end coupled to the building, structure, or object and has a long leg with an upper end positionable above the building, structure or object. An upper pivot member couples the upper ends of the long legs to the energy capturing device. A lower pivot member pivots the energy capturing device between a raised operative orientation above the building, structure, or object and a lowered inoperative orientation beneath the building, structure, or object. A control system allows positioning the energy capturing device with respect to the building, structure, or object.

1 Claim, 4 Drawing Sheets

TURNTABLE TRACKING DEPLOYMENT SYSTEM

BACKGROUND OF THE INVENTION

Field of the Invention

The present invention relates to a turntable tracking deployment system and more particularly pertains to the generation of energy, the energy device being trackable with regard to sunlight or wind direction, etc. and repositionable between a raised operative orientation above a roof or structure and a lowered inoperative orientation below the roof or structure, the deployment of the system and the tracking of the energy device and the generating of energy being done in a safe, ecological, convenient and economical manner.

SUMMARY OF THE INVENTION

In view of the foregoing disadvantages inherent in the known types of generating or collecting systems of known designs and configurations now present in the prior art, the present invention provides an improved turntable tracking deployment system. As such, the general purpose of the present invention, which will be described subsequently in greater detail, is to provide a new and improved turntable tracking deployment system and method which has all the advantages of the prior art and none of the disadvantages.

To attain this, the present invention essentially comprises an energy device positionable above any structure or object. A plurality of lifting components each have a short leg with a lower end coupled to the support structure or object. The plurality of lifting components each have a long leg with an upper end positionable above the support structure or object. An upper pivot member couples the upper ends of the long legs to the energy device. A lower pivot member pivots the energy panel between a raised operative orientation above the roof and a lowered inoperative orientation beneath the roof. A control assembly varies the position of the energy device with respect to the structure or object.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved turntable tracking deployment system which has all of the advantages of the prior art energy generating systems of known designs and configurations and none of the disadvantages.

It is another object of the present invention to provide a new and improved turntable tracking deployment system which may be easily and efficiently manufactured and marketed.

It is further object of the present invention to provide a new and improved turntable tracking deployment system which is of durable and reliable constructions.

An even further object of the present invention is to provide a new and improved turntable tracking deployment system which is susceptible of a low cost of manufacture with regard to both materials and labor, and which accordingly is then susceptible of low prices of sale to the consuming public, thereby making such turntable tracking deployment system economically available to the buying public.

Lastly, another object of the present invention is to provide a turntable tracking deployment system for the generating of energy, the energy device being trackable with regard to sunlight and repositionable between a raised operative orientation above a structure or object and a lowered inoperative orientation below the structure of object, the deployment of the system and the tracking of the energy device and the generating of energy being done in a safe, ecological, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
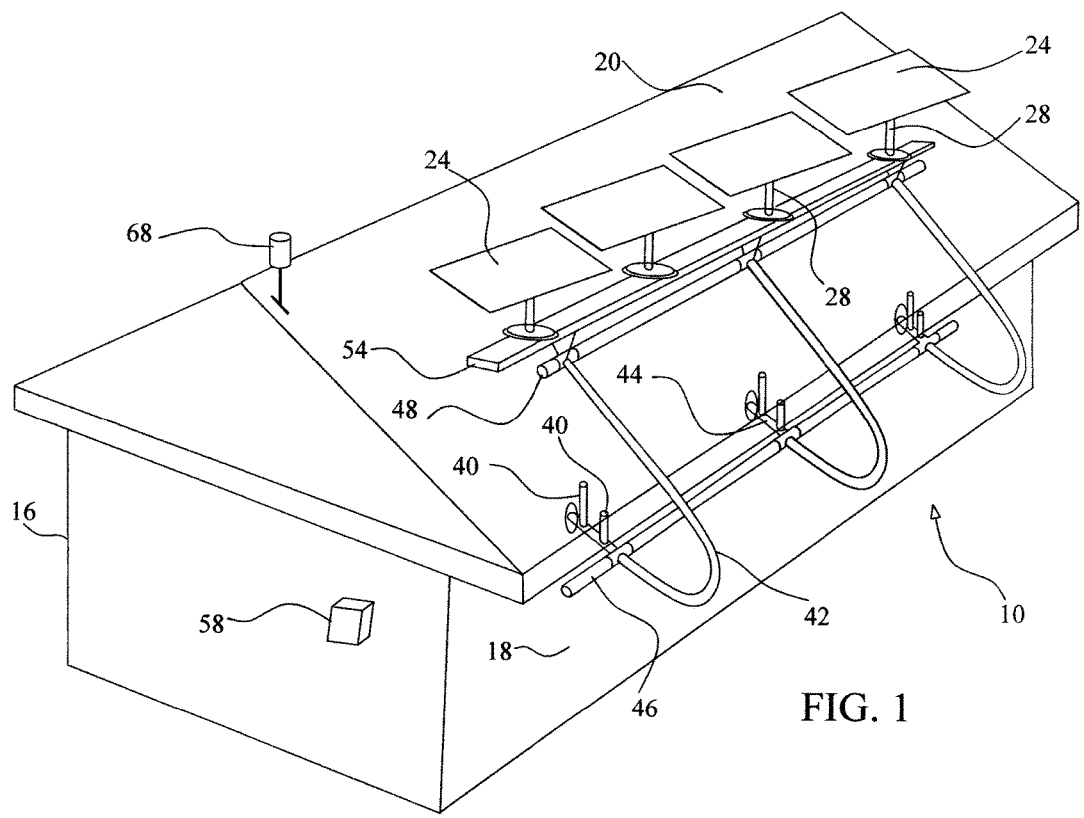
FIG. 1 is a perspective illustration of a turntable tracking deployment system constructed in accordance with the principles of the present invention.
Figure 2:
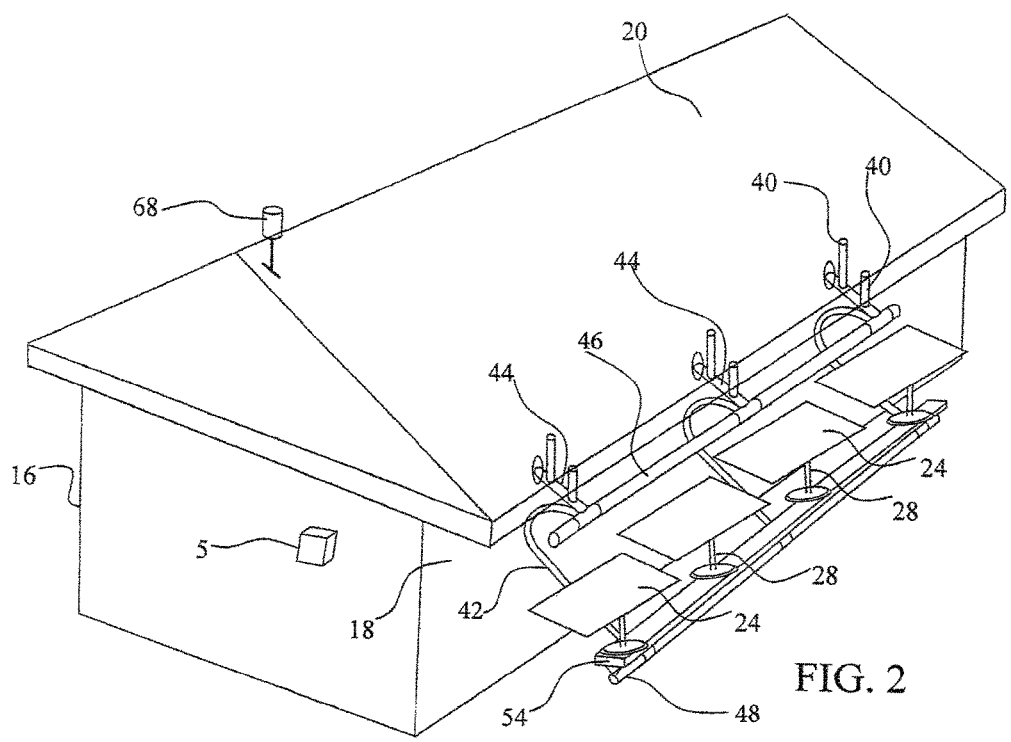
FIG. 2 is a perspective view similar to FIG. 1 but with the system in a lowered, inoperative orientation.
Figure 3:
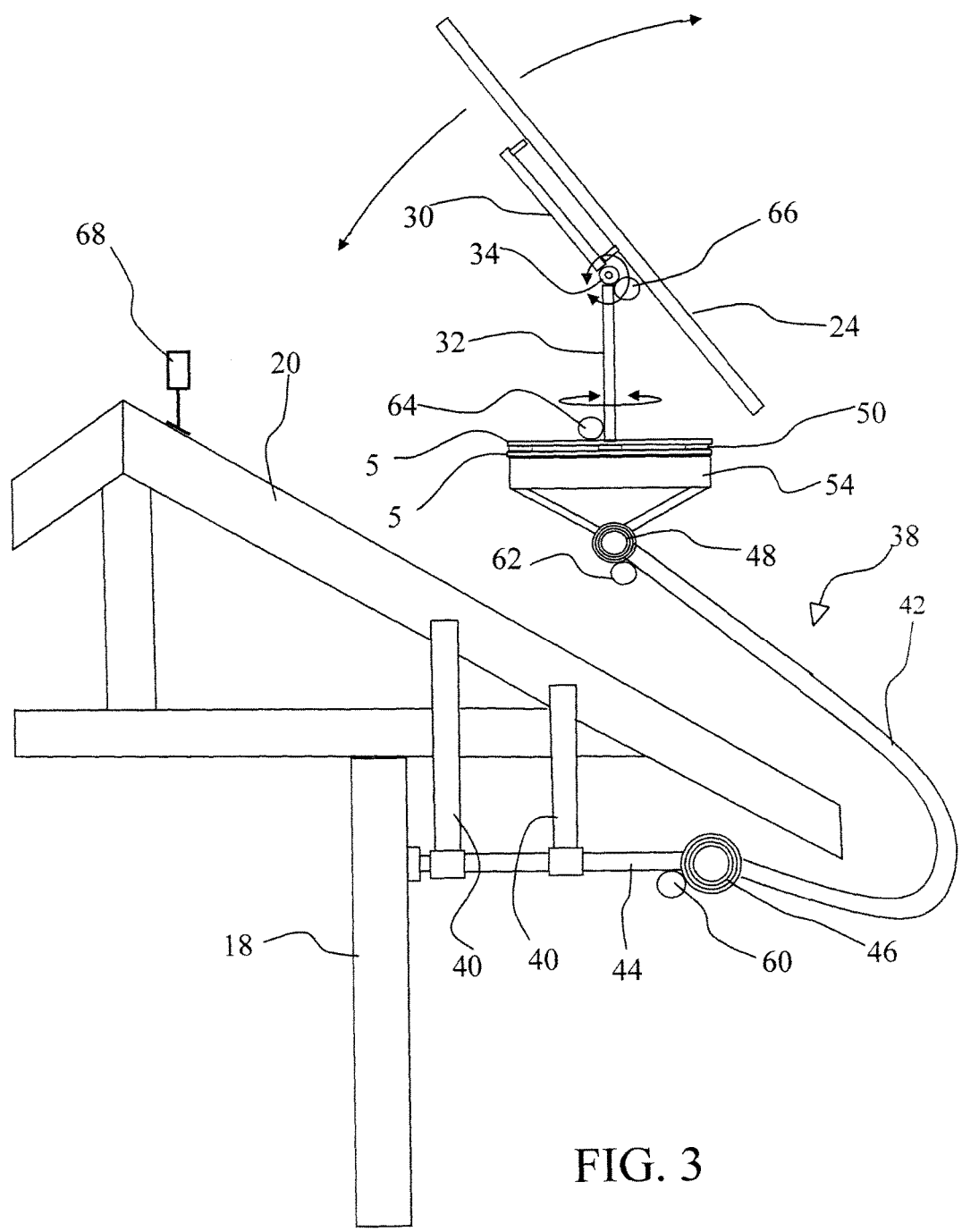
FIG. 3 is a side elevational view of the adjustable positioning components of the system shown in FIGS. 1 and 2.
Figure 4:
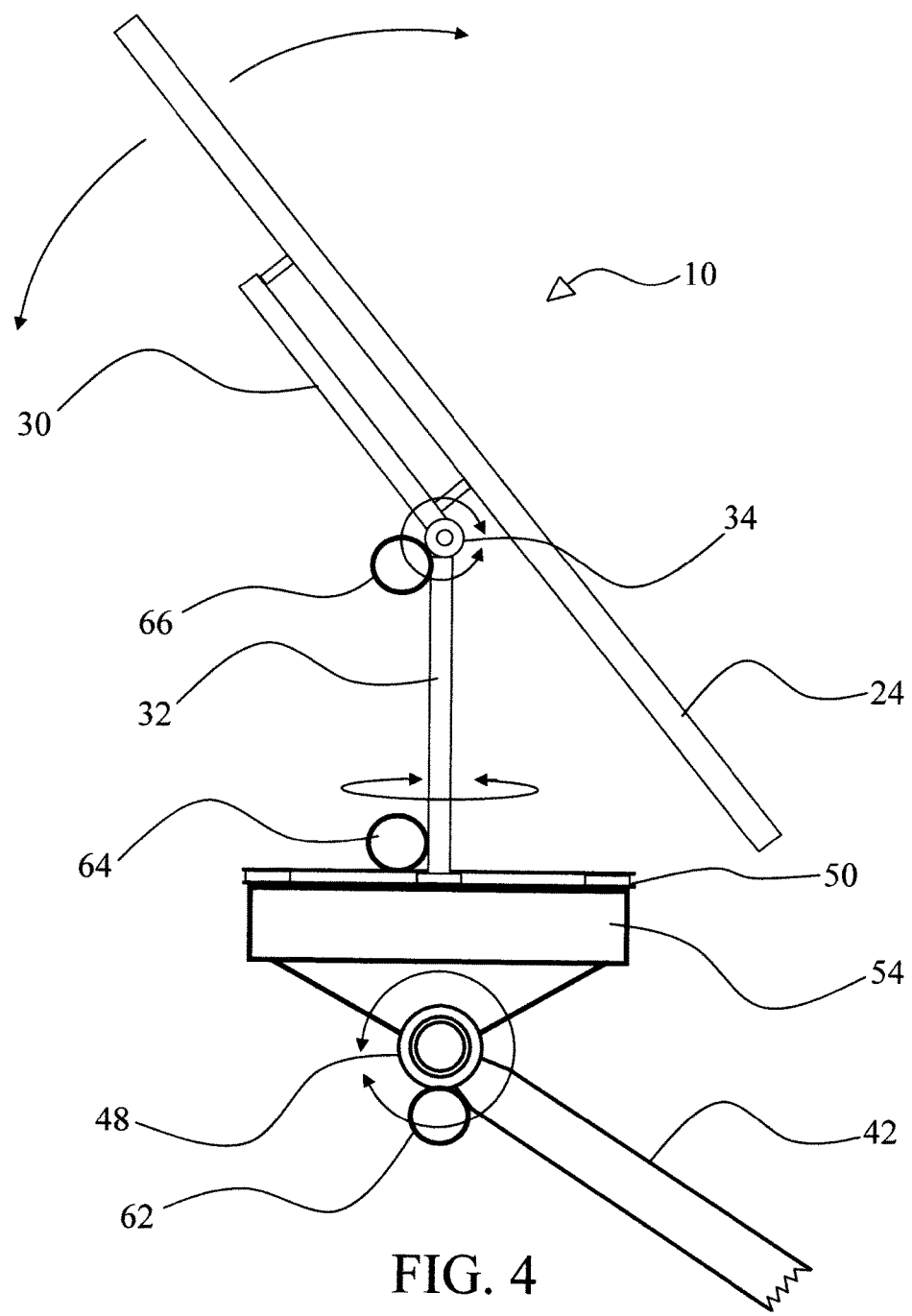
FIG. 4 is an enlarged side elevational view of the adjustable positioning components of the system as shown in FIG. 3.

With reference now to the drawings, and in particular to FIG. 1 thereof, the preferred embodiment of the new and improved turntable tracking deployment system embodying the principles and concepts of the present invention and generally designated by the reference numeral 10 will be described.

The present invention, the turntable tracking deployment system 10 is comprised of a plurality of components. Such components in their broadest context include an energy panel, lifting components, an upper pivot member, and a lower pivot member. Such components are individually configured and correlated with respect to each other so as to attain the desired objective.

From a specific standpoint, in the preferred embodiment of the invention, first provided is a building 16. The building has vertical walls 18. The building has a roof 20. The roof is positioned above the walls. The roof includes a major roof section. The roof includes an eve. The eve overhangs at least a portion of the building. The building includes a shielded area. The shielded are is laterally spaced from the building and beneath the eve.

The energy device includes a plurality of panels 24. Each panel has an upper edge. Each panel has a parallel lower edge. Each panel also has parallel side edges. The side edges couple the upper and lower edges. Each panel has a mid-point. The mid-point is equally spaced from the upper and lower edges. The mid-point is equally spaced from the side edges.

A plurality of masts 28 is provided. Each mast of the plurality of masts has an associated energy device from the plurality of energy devices. Each mast has an upper arm 30. Each mast also has a lower arm 32. Each mast further has a pivot joint 34. The pivot joint couples the upper and lower arms.

Provided next is a plurality of lifting components 38. Each lifting component can be J-shaped in the primary embodiment. Each lifting component has a short lower leg 44. Each lower leg 44 is attached to the structure by one or more support legs 40. Each lower leg has an inner extremity. Each lower leg has an outer extremity. Each lower leg is connected to the structure in the shielded area beneath the eve of the roof. Each lifting component has a long upper leg 42. Each long upper leg has an lower end. Each long upper leg has an upper end. The upper end is positioned above the roof during operation and use.

A horizontally disposed lower pivot tube 46 is also provided. The lower pivot tube pivotably couples the lower ends of the upper legs of the lifting components to the upper ends of the lower legs. The lower pivot tube is adapted to move the upper ends of the upper legs between the raised operative orientation and a lower orientation. For operation and use, the upper and lower ends of the upper legs are positioned in the raised orientation. For maintenance and repair, the upper and lower ends of the upper legs are positioned in the lowered orientation.

A horizontally disposed upper pivot tube 48 is also provided. The upper pivot tube pivotably couples the upper ends of the upper legs of the lifting components to the mounting platform 54. The upper pivot tube is adapted to move the mounting platform to the desired position during the energy collection operation in the raised position, and during maintenance and repair operations in the lowered orientation.

Further provided is tracking turntable 50. The tracking turntable is provided intermediate the upper ends of the upper arms of the lifting components and the lower arms of the masts. The tracking turntable includes a plurality of circular slewing plates 52. The tracking turntable includes a single mounting platform 54. The single mounting platform is provided intermediate the upper pivot tube and the plurality of slewing plates. Each slewing plate is rotatable about generally vertical axes. In this manner the rotational orientation of the panels with respect to the roof and sunlight during operation and use may be varied.

Provided last is a control system and controller 58. The control system and controller may be wired or wireless. The control system includes a first motor 60. In this manner the lower pivot tube is driven. The control system also includes a second motor 62. In this manner the upper pivot tube is driven. The control system includes a third motor 66. In this manner the pivot joint is driven. The control system further includes a fourth motor 64. In this manner the turntable is rotated. The control system includes a controller. In this manner the second, third and fourth motors are controlled. The control system includes a solar or wind sensor 68. In this manner the direction of sunlight or wind is located. Also in this manner the second, third and fourth motors are activated in response to the sensor. An overriding controller is provided. In this manner the first, second, third and fourth motors are activated.

The present invention is a single or multi axis energy collector deployment or collector tracking device. The invention is alternately named a single or multi axis solar wind or other environmental energy tracking device. The assembly consists of three main components, and one or more sub components. The main components include:

1. A turntable device which consists of two plates connected by a low friction bearing, allowing the two plates to rotate independently from each other. The lower part of the turntable, to be named the fixed plate, may be mounted to any support structure. It may or may not be the structure. The upper turntable plate can be rotated independently in a horizontal plane, or a vertical plane, or any angle in between, through an angle of 360 degrees or 180 degrees in each direction. This adjustment can be made by two methods (A) Manually rotating the upper plate as required. The position of the plate can then be fixed by a locking mechanism. (B) By attaching to the upper plate an automated mechanical device to provide the required rotation. This mechanical device provides a locking mechanism to prevent rotating movement of the upper plate when it is not desirable.

2. A jointed mast, consisting of an upper and a lower part. The lower mast is centrally located and affixed at its lower end to the upper turntable plate. At the upper end of the lower mast is the intersection of the two parts of the mast. This intersection consists of a swiveling joint, designed to move in a vertical elevational plane, and/or a horizontal azimuth plane, or any combination of angles in between elevation and azimuth.

3. A solar photo-voltaic panel or other solar energy or wind energy collecting, concentrating, or reflecting device. This device is attached immovably to the upper mast section. The sub-components are:

(i) Mechanical drive devices for the purpose of moving the various main components relative to each other. The power for the mechanical drives can be derived from any source available, such as electrical, hydraulic, pneumatic, hydro, or hydroelectric power.

(ii) Automated controllers for the purpose of causing the mechanical drives to operate in a predetermined and pre-programmed way.

(iii) Lock, brake, and clutch mechanisms to control unwanted movement of the movable joints.

The purpose of the two adjustable and movable connections in the energy tracking device is to enable the attached energy collecting, concentrating, or reflecting device to be angled in such a way as to collect the maximum available energy according to actual relevant environmental conditions or the geographic location of the device. And, in the case of photovoltaic energy, changing angle of elevation of the energy device relative to the daily and seasonally changing position of the sun. The two movable interfaces enable this to be achieved in two different ways:

(I) The adjustable swivel joint connecting the upper support mast to the lower mast allows the relative angle of these masts to be adjusted one to the other. This adjustment can be made either by manually changing the relative angle, or by providing a mechanized and automated device to change the relative angle to match the actual relevant environmental conditions or the geographical location of the device. And, in the case of photovoltaic energy, changing angle of elevation of the solar energy collecting device relative to the daily and seasonally changing position of the sun. This adjustment enables the solar collecting, concentrating, or reflecting device to collect the maximum available amount of solar energy at that specific geographic location.

(II) In the case of a solar photovoltaic energy collecting device, the swivel joint in the turntable allows this solar tracking device to follow the movement of the sun from east to west on a daily basis, by rotating the movable upper turntable plate relative to the fixed lower turntable plate. This rotation can be achieved by manually changing the horizontal angle (azimuth) relative to the sun's angle, or by an attached automated, mechanical device. The automated mechanical device can be programmed to follow the azimuth of the sun on a daily basis.

The solar tracking device can be employed in four different modes.

(A) As a support device in a fixed position for deploying and supporting solar-energy or wind energy collecting panels or devices. In this mode the collector is adjusted to the optimum angle for collecting the greatest possible amount of solar or wind energy depending on what type of collector is attached to it. The available pivot and swivel points are locked in place after they are correctly adjusted and aligned.

(B) As a single axis azimuth tracking device for deploying and supporting solar-energy or wind energy collecting panels or devices, utilizing a single movable and adjustable pivot point; this being the upper pivot point, located at the intersection of the two mast sections.

(C) As a single axis elevation tracking device for deploying and supporting solar-energy or wind energy collecting panels or devices, utilizing a single movable and adjustable swivel point; this being the horizontal swivel point located between the upper and lower turntable plates.

(D) As a dual-axis azimuth and elevation tracking device with two adjustable pivot or swivel points; these being both the mast pivot point as described in (B), and the turntable swivel point as described in (C).

The energy collection efficiency of the deployed and supported solar-energy or wind energy collecting panels or devices increases as the number of movable and adjustable pivot and swivel joints employed is increased.

The energy collection efficiency of the deployed and supported solar-energy or wind energy collecting panels or devices increases as the number of movable and adjustable pivot and swivel joints employed are mechanically driven and automated to point the energy collectors to collect the greatest possible amounts of energy available at the specific location and conditions.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A turntable tracking deployment system (10) for a structure energy capturing device (24) adapted to generate energy, the energy capturing device being trackable with regard to sunlight and wind and repositionable between a raised operative orientation above a structure and a lowered inoperative orientation below the structure, the deployment of the system and the tracking of the energy capturing device and the generating of energy being done in a safe, ecological, convenient, and economical manner, the system comprising, in combination:

a structure (16) with vertical walls (18) and a roof (20) there above, the roof including a major roof section and an eave overhanging at least a portion of the structure, the structure including a shielded area laterally spaced from the structure and beneath the eave;

the turntable tracking deployment system (12) including a plurality of energy capturing devices (24);

a plurality of masts (28), each mast of the plurality of masts having an associated one of the energy capturing devices, each mast having an upper arm (30) and a lower arm (32) and a pivot joint (34) coupling the upper and lower arms;

a plurality of lifting components (38), each lifting component having a short lower leg (40) with an inner end and having an outer end positioned in the shielded area beneath the eave of the roof at all times, each lifting component having a long upper leg (42), each long upper leg having a lower end, each long upper leg having an upper end, the upper end positionable above the roof during operation and use;

a horizontally disposed lower pivot tube (46) pivotably coupling the lower ends of the upper legs of the lifting components to the outer ends of the lower legs, the lower pivot tube adapted to move the upper ends of the upper legs between the raised operative orientation and the lowered inoperative orientation;

a horizontally disposed upper pivot tube (48), the upper pivot tube pivotably coupling the upper ends of the upper legs of the lifting components to a mounting platform (54), the upper pivot tube adapted to move the mounting platform to a desired position during the energy capturing operation in the raised operative position and during maintenance and repair operations in the lowered inoperative orientation;

a tracking turntable (50) intermediate the upper ends of the upper arms of the lifting components and the lower arms of the masts, the tracking turntable including a plurality of circular slewing plates (52), a single mounting platform (54) intermediate the upper pivot tube and the plurality of circular slewing plates, each circular slewing plate being rotatable about axes to vary the rotational orientation of the energy capturing devices with respect to the structure and sunlight and wind during operation and use; and a control system and controller (58) including a first motor (60) to drive the lower pivot tube, a second motor (62) to drive the upper pivot tube, a third motor (64) to drive the pivot joint, and a fourth motor (66) to drive the turntable, the controller adapted to activate and inactivate the first, second, third, and fourth motors, a solar sensor (68) to detect the location of sunlight and wind and to activate the first, second, third, and fourth motors in response to the sensor; and an overriding controller to activate the first, second, third, and fourth motors.

* * * * *